(12) United States Patent
Drivon et al.

(10) Patent No.: US 11,499,657 B2
(45) Date of Patent: Nov. 15, 2022

(54) CLAMPING COLLAR WITH RETAINING LOOP

(71) Applicant: CAILLAU, Issy les Moulineaux (FR)

(72) Inventors: Stéphane Drivon, Romorantin (FR); Fabrice Prevot, Selles sur Cher (FR)

( * ) Notice: Subject to any disclaimer, the term of this patent is extended or adjusted under 35 U.S.C. 154(b) by 210 days.

(21) Appl. No.: 16/924,306

(22) Filed: Jul. 9, 2020

(65) Prior Publication Data
US 2021/0018124 A1 Jan. 21, 2021

(30) Foreign Application Priority Data
Jul. 15, 2019 (FR) ...................................... 19 07955

(51) Int. Cl.
*F16L 23/08* (2006.01)
*F16L 23/036* (2006.01)
*F16L 23/18* (2006.01)
*F16L 23/026* (2006.01)

(52) U.S. Cl.
CPC ............. *F16L 23/08* (2013.01); *F16L 23/036* (2013.01); *F16L 23/18* (2013.01); *F16L 23/026* (2013.01)

(58) Field of Classification Search
CPC ......... F16L 23/036; F16L 23/04; F16L 23/08; F16L 23/12; F16L 23/16; F16L 23/162; F16L 23/18
USPC ... 285/18, 23, 337, 364, 365, 366, 367, 407, 285/410
See application file for complete search history.

(56) References Cited

U.S. PATENT DOCUMENTS

| | | | |
|---|---|---|---|
| 7,399,005 B2 | 7/2008 | Caillau | |
| 9,016,731 B2 | 4/2015 | Caillau | |
| 2017/0284578 A1* | 10/2017 | Prevot | ................... F16L 23/032 |

FOREIGN PATENT DOCUMENTS

| | | |
|---|---|---|
| EP | 1451498 B1 | 3/2006 |
| EP | 2598785 B1 | 9/2015 |
| WO | 03081108 A1 | 10/2003 |

OTHER PUBLICATIONS

English language abstract of WO03081108.

* cited by examiner

*Primary Examiner* — Aaron M Dunwoody
(74) *Attorney, Agent, or Firm* — Robert Facey

(57) ABSTRACT

A clamping system for connecting a first tube and a second tube, the clamping system including a collar which includes a belt able to be clamped around clamping surfaces of the first and second tubes, the belt has a first and a second flank between which an internal recess able to receive the clamping surfaces is delimited. The collar carries at least one retaining loop disposed outside the belt. The loop has a first end fastened to the collar and a second end which is free and which is located on the outer side of the first flank. The loop is able to adopt a position of active retaining configuration in which its second end protrudes towards the axis of the collar relative to the edge of the first flank, and to be deformed relative to this active configuration so that the second end is moved radially outwardly.

10 Claims, 5 Drawing Sheets

[Fig.1]
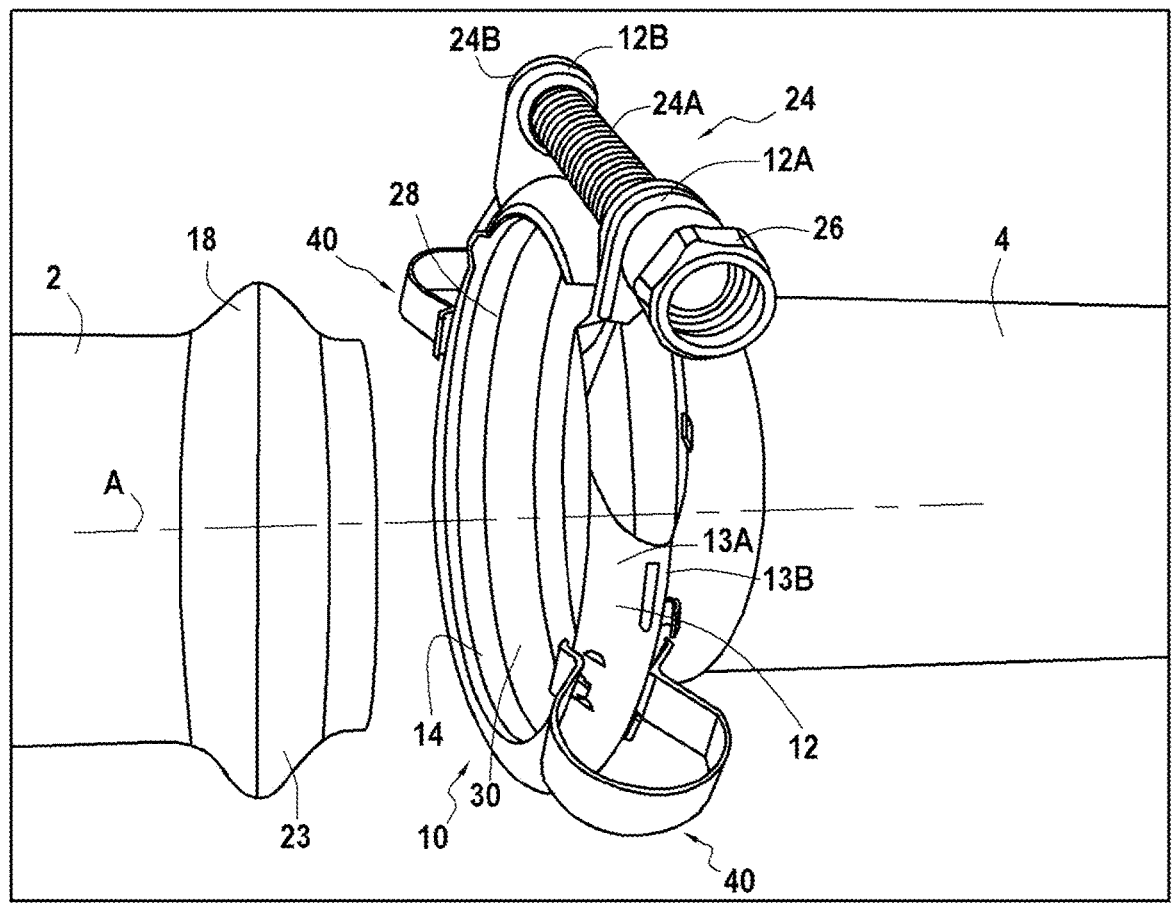
[Fig.2]
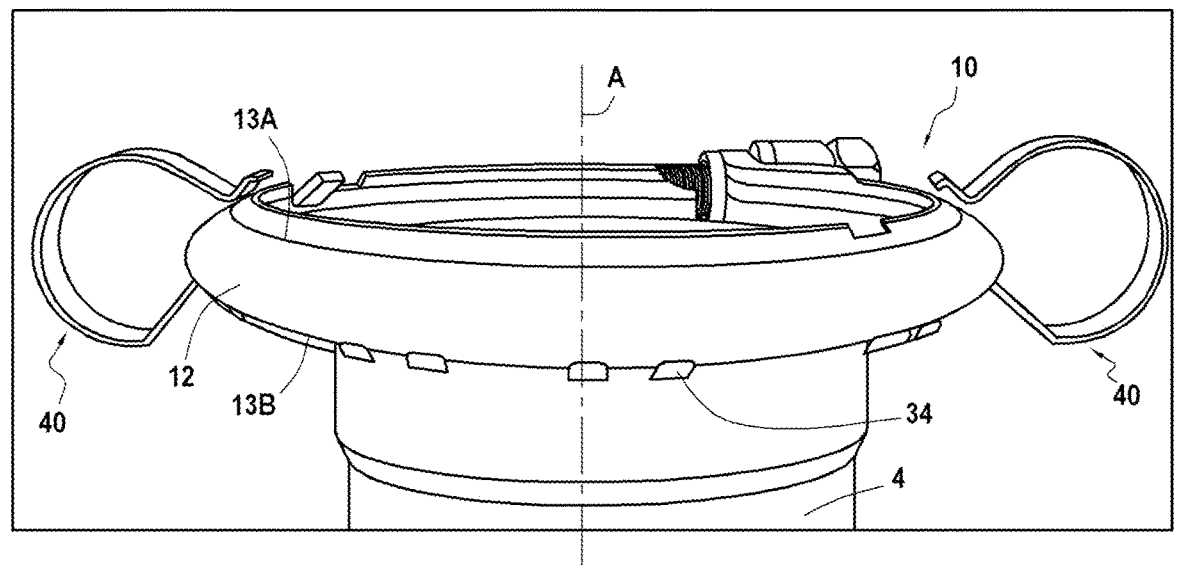

[Fig.3]
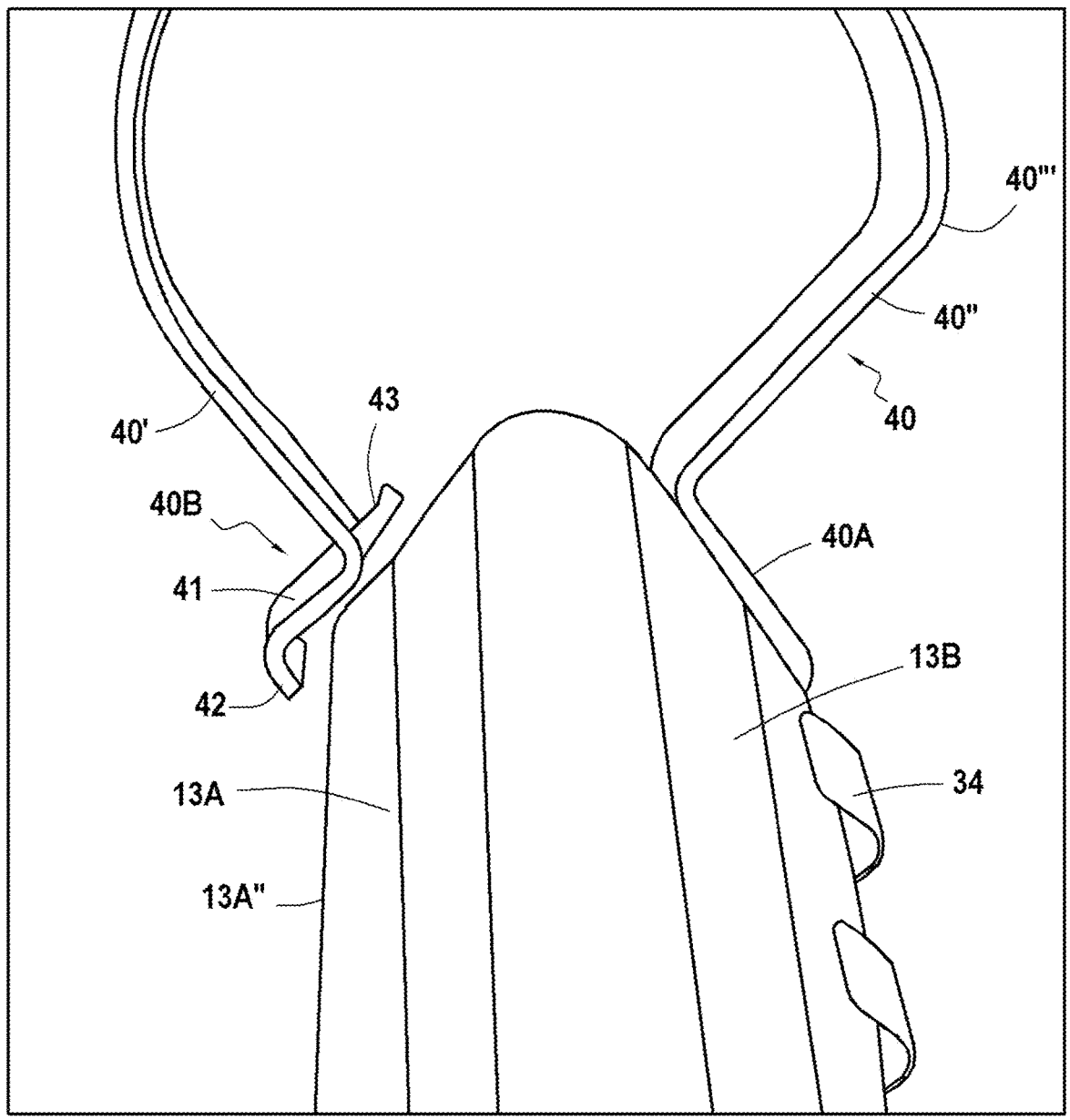

[Fig.4]
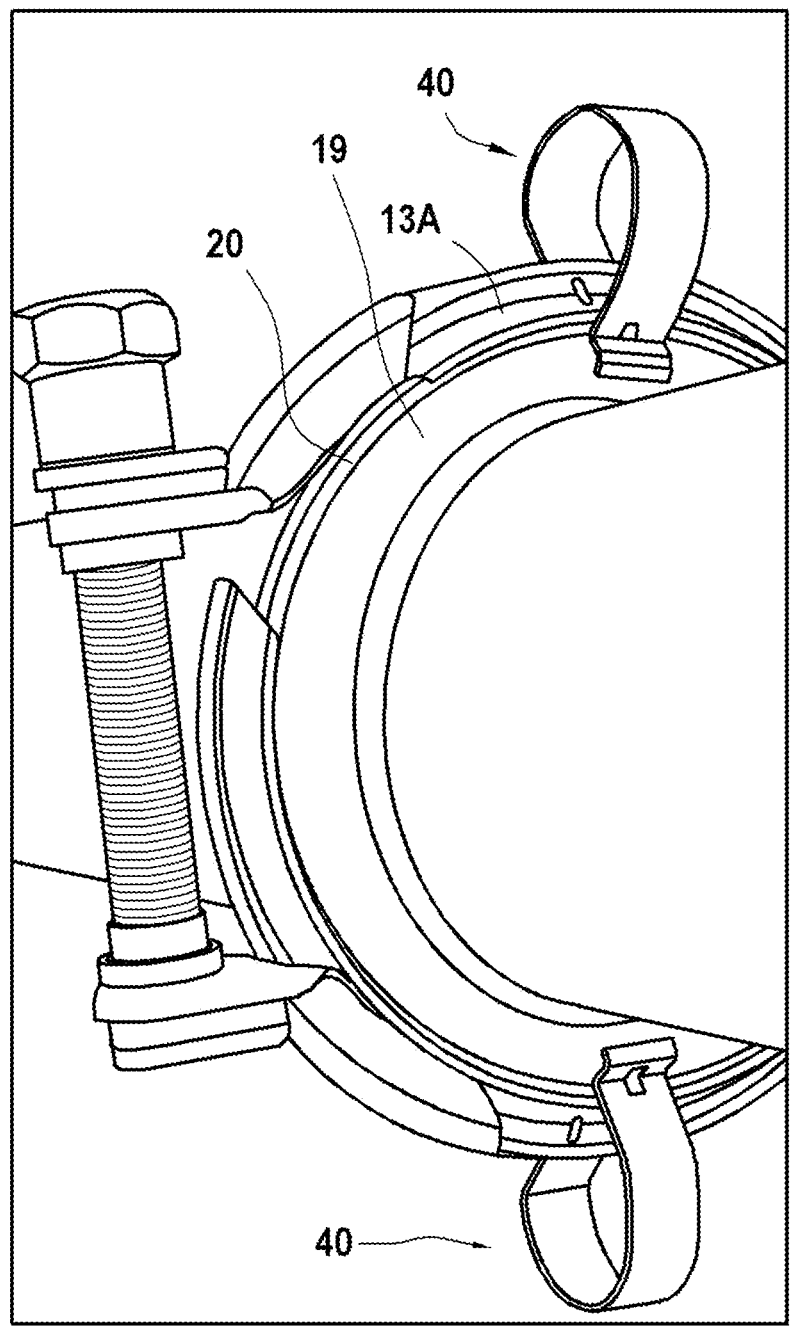

[Fig.5]
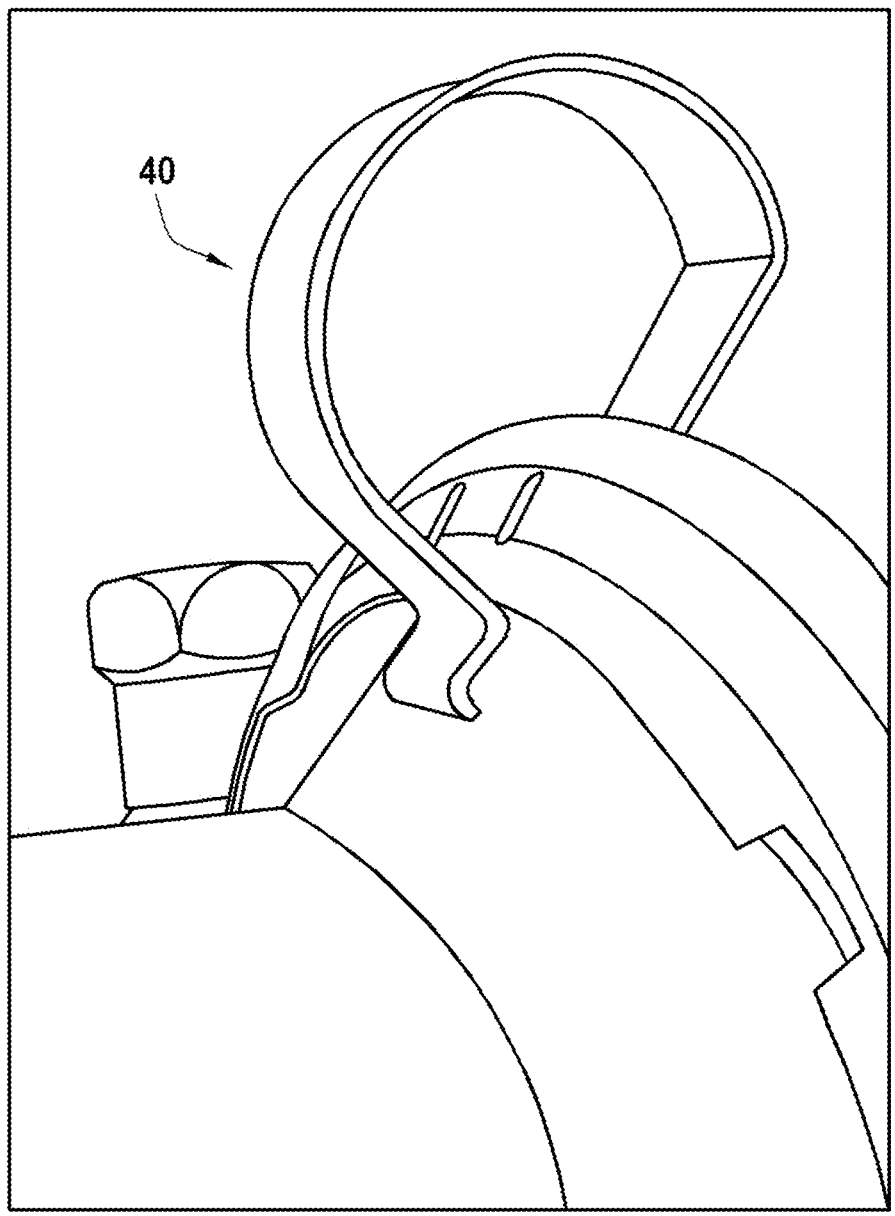

[Fig.6]
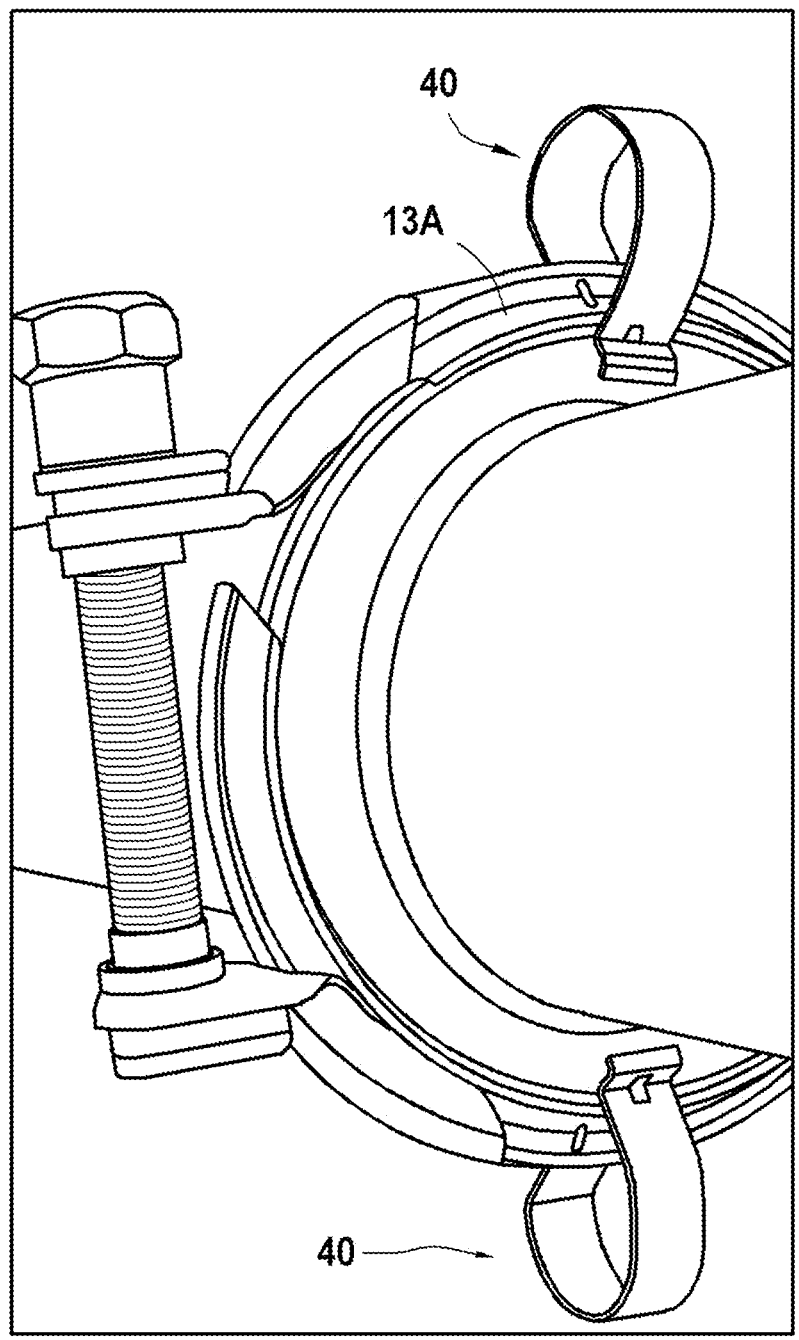

CLAMPING COLLAR WITH RETAINING LOOP

BACKGROUND

The present disclosure relates to a clamping system for connecting a first and a second tube whose opposite ends have clamping surfaces protruding from the cylindrical outer surface of said tubes.

A clamping system of this type is known, for example from European patents EP 1 451 498 and EP 2 598 785.

In such a system, the collar comprises a belt able to be clamped around the clamping surfaces of the tubes. The belt has flanks between which an internal recess is delimited in which the clamping surfaces of the tubes are disposed to carry out the clamping. The tubes are thus retained clamped relative to each other. As indicated in the aforementioned patents, it may be useful to pre-mount the clamping system on the end of at least one of the tubes before carrying out the clamping.

In order to allow a pre-mounting on the two tubes, EP 2 598 785 recommends that the clamping system comprises a washer, retained relative to the collar by fastening lugs, and comprising first and second pre-mounting lugs able to respectively cooperate with the first and the second tube to retain the washer, and therefore the entire clamping system, relative to the respective clamping surfaces of the tubes before the clamping. These pre-mounting lugs in this case comprise short lugs extending back above the frustoconical annular shape of the washer to cooperate with the clamping surface of the tube whose clamping surface is disposed between the belt and the washer. These pre-mounting lugs also include long lugs, which extend from the top of the washer in the opposite direction to the washer to cooperate with the clamping surface of the other tube.

In EP 2 598 785, the lugs of these two categories are elastically deformable. This device is generally satisfactory, but, for some applications, it is important to improve reliability of the retention of the lugs relative to the clamping surfaces, particularly as regards the long lugs. Indeed, concerning particularly long lugs, it may be difficult to ensure the right range of elastic deformation for some clamping diameters, particularly large diameters on the order of 5 cm or more. On the one hand, it is necessary to ensure that the modulus of elasticity of these lugs is sufficiently high so that they have the desirable elasticity for elastically recovering, after having been deformed upon engagement of the tube in the clamping system, a position ensuring the pre-mounted retention of this tube. They must then have the elastic responsiveness necessary in order not to be too easily deformed if traction is exerted on the tube in the direction of its disengagement from the clamping system. However, this elastic retention is useful only in the pre-mounted state, before the clamping. In the clamped state, it is on the contrary desirable that the lugs are deformed to be pressed inside the belt of the collar, without affecting the quality of the clamping. However, if the elastic modulus of the lugs is high, this latter property may be difficult to achieve in some cases, particularly for large-diameter collars. In addition, if the elastic modulus is too high, the engagement pushing force required for the clipping of the lugs on the clamping surface of the tube can be high, and difficult to achieve in a context of final mounting.

Thus, even though the system of EP 2 598 785 is satisfactory for a large number of applications, it is desirable to propose another solution allowing a pre-mounting of the clamping system at the end of the first tube substantially free from the aforementioned drawbacks, particularly for the large-diameter collars.

EP 1 451 498 proposes a system allowing a pre-mounting relative to a tube, using pre-mounting lugs also carried by the belt via a washer itself carried by the belt. The same problems as those mentioned above can arise for a pre-mounting relative to a single tube.

Other clamping systems are also known comprising a collar and a washer carried by the collar, the washer having internal lugs, able to grip inside one of the tubes, for pre-mounting the clamping system at the end of this tube. It may be useful to complete this system to also allow a pre-mounting relative to the other tube. For that, it is possible to use the long lugs proposed by EP 2 598 785 but, particularly for large-diameter collars, there is a need for another solution, substantially free from the abovementioned drawbacks.

SUMMARY

Generally, there is a need for a clamping system allowing controlled retention in the pre-mounted state relative to the clamping surface of one of the tubes it is intended to clamp.

Thus, the present disclosure relates to a clamping system for connecting a first and a second tube whose opposite ends have clamping surfaces protruding from the cylindrical outer surface of said tubes, the system comprising a collar which comprises a belt able to be clamped around said clamping surfaces, the belt having a first and a second flank between which an internal recess able to receive the clamping surfaces is delimited, the collar carrying at least one retaining loop disposed outside the belt, the loop having a first end fastened to the collar and a second end which is free and which is located on the outer side of the first flank, the loop being able to adopt an active retaining configuration in which its second end protrudes towards the axis of the collar relative to the edge of the first flank, and to be deformed relative to this active configuration so that said second end is moved radially outwardly.

Thus, the loop can possibly be elastically deformed like a spring. Its proper positioning can be easily observed due to its loop shaping according to which it protrudes radially from the collar, outside the latter. In its active retaining configuration, the second end protrudes inwardly from the edge of the first flank, so that it can directly cooperate with the clamping surface of the first tube when the latter is inserted into the clamping system. It is therefore not necessary to add an element onto this first tube.

The loop extends radially and axially. Indeed, it radially protrudes from the belt of the collar and its general orientation is along the axial direction, its first and second ends being axially distant from each other.

Optionally, the first end of the loop is fastened to the second flank of the belt, optionally by welding.

Optionally, the loop has a common part spaced from the belt.

Optionally, the second end of the loop has a free end forming a claw folded back radially towards the axis of the collar.

Optionally, the loop has, in the vicinity of its second end, a hook able to be hooked on the edge of the first flank in the active retaining configuration of the loop.

Optionally, the clamping system comprises two angularly spaced, optionally diametrically opposite retaining loops.

The present disclosure will be clearly understood and its advantages will appear better upon reading the following detailed description of one embodiment represented by way of non-limiting example.

BRIEF DESCRIPTION OF THE DRAWINGS

FIG. 1 is a perspective view of an assembly comprising a clamping system according to the present disclosure, and two tubes.

FIG. 2 shows a side view of the end of the second tube provided with a clamping system according to the disclosure, before its connection with the first tube.

FIG. 3 is an enlargement of a part of FIG. 2.

FIG. 4 is a side view showing the connected assembly, seen from the side of the second tube.

FIG. 5 shows the retaining cooperation between the retaining loop and the first tube.

FIG. 6 shows the two tubes pre-assembled using the clamping system, from the side of the first tube.

DETAILED DESCRIPTION

FIGS. 1 and 2 are described at first. It can be seen in these figures that the clamping system comprises a collar 10, of the same type as the one described in EP 2 598 785 and a washer 28, which cooperate to assemble two tubes 2, 4.

In the following, "radially internal" elements will refer to the elements that are directed towards the axis A of the two tubes placed end to end and that are closest to this axis A relative to other elements referred to as "radially external" elements, the "radially external" elements also being those that are directed away from the axis A. It is also considered that the axis A of the two tubes is also the axis of the collar, more specifically the axis of the collar belt, the latter being wound on itself.

Furthermore, it will be considered that a second element is "external" or "axially external" to a first element, if the second element is located next to the first one, that is to say outside the axial slice occupied by the first element.

The collar 10 comprises a belt 12 which delimits a recess 14 in which the bearing surfaces, respectively 18 belonging to the first tube 2 and 20 belonging to the second tube 4 can be inserted. This recess and these bearing surfaces have shapes such that the clamping of the belt of the collar forces the ends of the tubes 2 and 4 to come close to each other. The recess 14 is delimited between a first and a second flank 13A and 13B of the belt 12, these flanks defining in this case the branches of a V seen in axial section. Thus, the belt 12 has an advantageously V-shaped axial section, while the bearing surfaces 18 and 20 have a diameter which increases progressively towards the opposite free ends of the tubes and have for example a frustoconical shape.

The belt 12 has ends respectively 12A and 12B, which are straightened substantially radially so as to form bearing lugs. These lugs are pierced so as to allow the passage of the rod 24A of a clamping screw 24 through these lugs. The head 24B of the screw is wedged relative to one of the bearing lugs, in this case the lug 12B, while a nut 26 is retained relative to the other bearing lug 12A. It is understood that the rotation of the nut in the direction of screwing brings the bearing lugs closer to each other and therefore reduces the inner diameter of the collar, that is to say it allows clamping the strip. Of course, other ways of clamping the strip can be envisaged, for example hooking systems, as described in particular in patent application FR 3 008 160.

The clamping system comprises a washer 28 which is secured to the collar. The washer may particularly be of the type described in EP 1 451 498.

This washer 28 has a frustoconical annular portion 30 which can be inserted between the opposite ends of the two tubes 2 and 4 when they are engaged in the clamping system. Indeed, the washer 28 is retained relative to the belt, in this case relative to its second flank 13B, by fastening lugs so that an annular space is arranged between the second flank and the washer. The free end of the second tube 4 carrying its bearing surface 20 is inserted into this annular space inside the recess 14, while the free end of the first tube 2 carrying its bearing surface 18 is inserted on the opposite side of the annular space relative to the washer, that is to say against the internal face of the frustoconical portion 30 of the washer 28.

In this case, the end of the tube 4 is a female flared part, the internal periphery of its bearing surface 20 forming a flared part. On the other hand, the free end of the first tube 2 is a male end which, beyond its bearing surface 18, has an outer periphery 23 whose diameter gradually decreases towards the termination of the free end. The end part 23 thus formed can therefore be inserted, substantially in a form-fitting manner, inside the flared part formed at the end of the tube 4. The frustoconical portion 30 of the washer 28 may have annular deformations forming a seal between the internal surface of the flared part 19 and the external periphery 23.

The fastening of the washer 28 of the collar 10 and/or the pre-mounting of the clamping system comprising the collar and the washer on the tube 4 can be ensured in the same way as in EP 1 451 498, by fastening lugs and/or pre-mounting lugs 34 with which the washer is equipped, these lugs serving to hook the washer on the second flank 13B of the belt, while arranging the abovementioned annular space, as described in EP 1 451 498.

Other modes of fastening the washer to the collar can be used. For example, the washer may have a retaining loop in which the shank of the screw 24 can be engaged, as well as one or several retaining lugs which can be retained on the edge of the belt, for example by hooking or by pinching. Likewise, other modes of pre-mounting the clamping system relative to the tube 4 can be used, for example, by equipping the washer with internal lugs or studs engaged in the tube 4 to cling on the internal surface of the tube 4.

The collar carries two retaining loops 40 which are disposed outside the belt 12. As can best be seen in FIG. 2, these two retaining loops are in this case diametrically opposite to each other and in a way form loop ears for the clamping system. As best seen in FIG. 3, the loop 40 has a first end 40A fastened to the collar 10 and a second end 40B which is free. This second end 40B is located on the outer side of the first flank, at a short distance therefrom. In this case, this second end has a connection portion 41 which extends between the common part 40' of the loop and the free end 42 of this second end. This connection portion 41 is oriented substantially parallel to the first flank 13A, while the free end 42 is folded back radially inwardly so as to form a claw directed towards the axis A of the collar. The first end 40A of the loop is for example fastened by welding on the external surface of the second flank 13B. This first end 40A extends parallel to this first flank. The common part 40' of the loop 40 extends between the ends 40A and 40B.

The loop has the shape of a corrugation, substantially like the loop of an omega. To promote its responsiveness, this common part of the loop may however have a substantially rectilinear first segment 40" which extends from the first end 40A up to a fold 40''' from which the loop forms a continuous curve. The common part 40' of the loop is spaced from the belt. In the vicinity of its second end 40B, the loop 40 has a hook 43 which, as best understood in FIG. 6, is hooked on the edge of the first flank 13A in the active retaining configuration of the loop.

The two loops 40 are similar and disposed substantially diametrically opposite to each other.

In its initial standby configuration, the loop can be, as indicated in FIGS. 2 and 3, in a situation in which its second end 40B is disposed slightly above the first flank 13A. In this configuration, the free end 42 can be located substantially at the same radial level as the edge 13A" of the first flank 13A. It is however conceivable that, in this situation, the free end 42 projects radially inwardly, this is to say towards the axis A of the collar relative to this edge 13A". In this situation, the end of the first tube 2 can be fitted inside the clamping system. If necessary, particularly if the free end 42 initially projects radially inwardly relative to the edge of the first flank, the surface 23 formed at the end of the first tube can cooperate with the free end 42 to slightly space it away radially so as to allow the passage of the clamping surface 18 under this free end. Due to the length of the connection portion 41, it can be easily arranged that, in any event, the hook 43 remains axially next to the first flank 13A in the free state of the loop, so that this hook does not oppose the aforementioned radial spacing.

Once the clamping surface 18 of the first tube has reached the recess 14 of the belt of the collar, the second end 40B of the loop 40 can be hooked on the edge of the first flank 13A using the hook 43. This can be done by a very simple movement of deformation radially inwardly. Due to the corrugated shape of the loop, a pressure exerted on the loop radially inwardly will naturally move the free end 42 forwards against the clamping surface 18 and, as the pressure is released, the hook 43 will naturally be inserted under the edge of the first flank 13A.

In this situation, the free end of the loop grips on the clamping surface 18, so as to retain the first pre-assembled tube in the clamping system. The same obviously applies for the two loops 40.

It should be noted that the hook 43 can be made by a partial cutout in the strip in which the loop is formed, this cutout arranging a tab which is folded back in a suitable manner to form the hook. In this case, the hook 43 extends in the extension of the connection portion 41 of the second end of the loop, but opposite to the latter. This connection portion 41 has the shape of a flange which carries the free end 42.

For the mounting of the assembly comprising the two tubes and the clamping system, the free end of the tube 4 is first engaged in the annular space arranged between the washer 28 and the second flank 13B of the belt so as to pre-mount the clamping system around this free end, then the free end of the tube 2 is engaged in the clamping system, until reaching the position represented in FIG. 4.

The retaining loop constitutes in itself a simple element to manufacture, for example from a metal strap cut out into small strips. It can be easily fastened to the first flank of the belt, for example by welding. Its common part spaced from the belt can promote its elastic deformation effect like a spring. The claw folded back radially towards the axis of the collar can grip on the clamping surface of the first tube to maintain the latter in the pre-mounted position inside the clamping system. The fact of being able to have two angularly spaced loops, for example diametrically opposite to each other, promotes the centering of the first tube relative to the clamping system and contributes to maintaining it in the pre-assembled position, without risk of tilting.

The fact of providing the loop with a hook can allow retaining this loop relative to the edge of the first flank of the belt so as to maintain the radial projection inwardly of the second end of this loop, which promotes maintaining the first tube in the pre-assembled position relative to the clamping system. The implementation of this hooking is extremely simple, and can be operated by a simple radial pressure inwardly on the loop. It should be noted that, if the retaining loop has the required responsiveness, for example due to the thickness of the small strip in which it is formed, or to the presence of stiffening elements such as ribs, it is possible to dispense with the presence of the hook used to secure its active retaining position.

The clamping belt, the washer and the retaining loop are preferably made of metal. Concerning particularly the washer and the retaining loop, they can be made in a stainless steel strap of the austenitic type, and having particularly a thickness comprised between 0.1 mm and 0.5 mm, or even between 0.2 and 0.4 mm.

The invention claimed is:

1. A clamping system for connecting a first and a second tube whose opposite ends have clamping surfaces protruding from cylindrical outer surface of said tubes, the system comprising a collar which comprises a belt able to be clamped around said clamping surfaces, the belt having a first and a second flank between which an internal recess able to receive the clamping surfaces is delimited, the collar carrying at least one retaining loop disposed outside the belt, the loop having a first end fastened to the collar and a second end which is free and which is located on an outer side of the first flank, the loop being able to adopt an active retaining configuration in which the second end protrudes towards an axis of the collar relative to an edge of the first flank, and to be deformed relative to this active configuration so that said second end is moved radially outwardly.

2. The clamping system according to claim 1, wherein the first end of the loop is fastened to the second flank of the belt.

3. The clamping system according to claim 1, wherein the first end of the loop is fastened to the second flank of the belt by welding.

4. The clamping system according to claim 1, wherein loop has a common part spaced from the belt.

5. The clamping system according to claim 1, wherein the second end of the loop has a free end forming a claw folded back radially towards the axis of the collar.

6. The clamping system according to claim 1, wherein the loop has, in the vicinity of the second end, a hook able to be hooked on the edge of the first flank in the active retaining configuration of the loop.

7. The clamping system according to claim 1, comprising two angularly spaced retaining loops.

8. The clamping system according to claim 7, wherein the two retaining loops are diametrically opposite retaining loops.

9. A clamping system for connecting a first and a second tube whose opposite ends have clamping surfaces protruding from cylindrical outer surface of said tubes, the system comprising a collar which comprises a belt able to be clamped around said clamping surfaces, the belt having a first and a second flank between which an internal recess able to receive the clamping surfaces is delimited, the collar carrying at least one retaining loop disposed outside the belt, the loop having a first end fastened to the collar and a second end which is located on an outer side of the first flank, the loop being able to adopt an active retaining configuration in which the second end protrudes towards an axis of the collar relative to an edge of the first flank, and to be deformed relative to this active configuration so that said second end is moved radially outwardly, the second end of the loop being a free end and comprising a claw folded back radially towards the axis of the collar, and the claw being configured to grip on the clamping surface of one of the tubes.

10. A clamping system for connecting a first and a second tube whose opposite ends have clamping surfaces protruding from cylindrical outer surface of said tubes, the system comprising a collar which comprises a belt able to be clamped around said clamping surfaces, the belt having a first and a second flank between which an internal recess able to receive the clamping surfaces is delimited, the collar carrying at least one retaining loop disposed outside the belt, the loop having a first end fastened to the collar and a second end which is located on an outer side of the first flank, the loop being able to adopt an active retaining configuration in which the second end protrudes towards an axis of the collar relative to an edge of the first flank, and to be deformed relative to this active configuration so that said second end is moved radially outwardly, the second end of the loop being a free end and comprising a claw folded back radially towards the axis of the collar, and the loop further having, in the vicinity of the second end, a hook able to be hooked on the edge of the first flank in the active retaining configuration of the loop.

* * * * *